Sept. 13, 1966  A. SPINNER  3,272,022
SLIDE ACTUATING MECHANISM FOR A MACHINE TOOL
Filed Dec. 18, 1963  2 Sheets-Sheet 1

INVENTOR
Adolf Spinner 3,272,022
SLIDE ACTUATING MECHANISM FOR A
MACHINE TOOL
Adolf Spinner, 38 Dachauer Strasse, Munich, Germany
Filed Dec. 18, 1963, Ser. No. 331,412
12 Claims. (Cl. 74—53)

This invention relates to machine tools, and more particularly to slide actuating mechanisms on automatic lathes and the like.

Cutting tools or workpieces in automatic lathes and the like are conventionally mounted on slides connected to the main drive mechanism of the machine tool in such a manner that the tools or workpieces are moved between inoperative and operative positions in a cyclic manner. Movement of the slides is actuated by a rotating cam, usually a radial cam, and by a cam follower. The follower travels over the cam face while the cam rotates, and is suitably linked to the slide. The cam follower is held in contact with the cam face by a spring, by a weight, by a fluid pressure operated piston or by other yieldably resilient devices.

Since precise positioning of the tool or workpiece depends on the cam follower moving in the exact path determined by the cam face, the force which urges the follower against the cam face must be relatively great. If it is desired to move the slide beyond the range of movement actuated by the cam, the strong force of the resilient device must be overcome.

The object of the invention is the provision of a slide actuating mechanism in which the slide can be manually moved beyond the range of normal cyclic movement without much effort, and without disassembly of the mechanism.

Other objects and features of the invention will become apparent to those skilled in the art as the disclosure is made in the following detailed description of a preferred embodiment as illustratde in the accompanying drawing in which.

Figure 1:
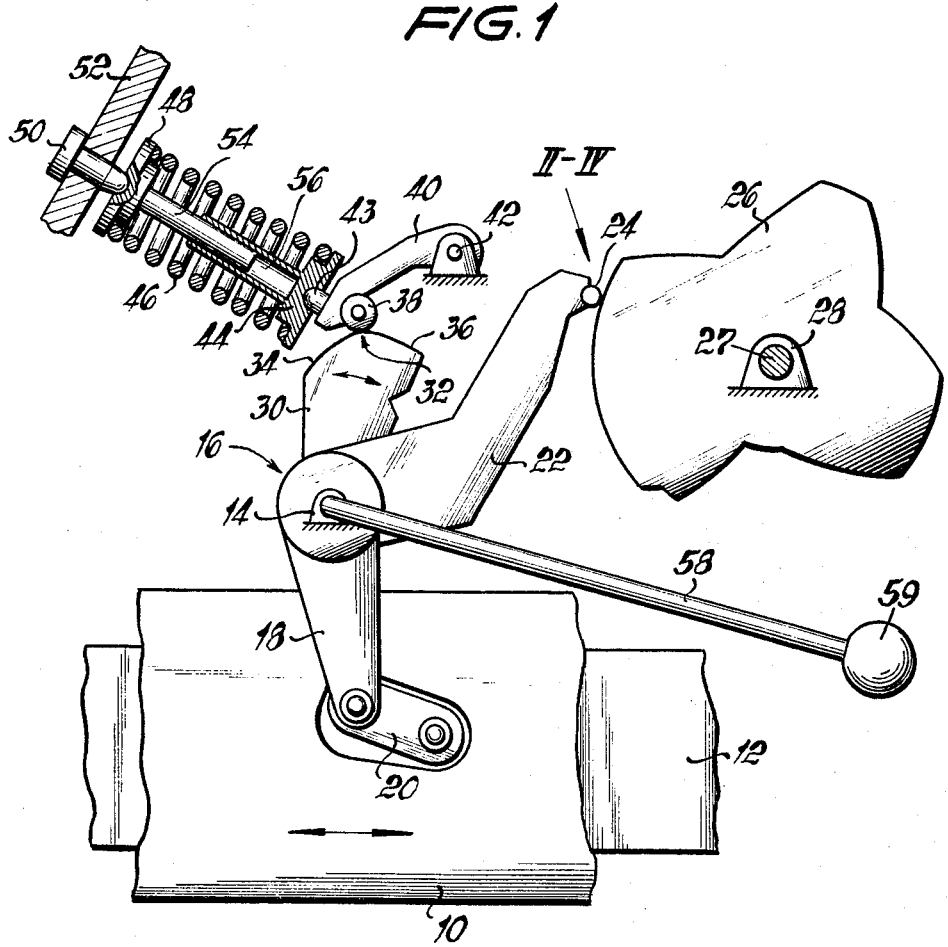
FIG. 1 is a fragmentary side-elevation view, partly in section, of an automatic machine tool equipped with the slide actuating mechanism of the invention.

Referring initially to FIG. 1 of the drawing, there is shown only as much of an automatic lathe as is necessary for an understanding of this invention.

A slide 10 is reciprocably movable on a guide portion 12 of the stationary machine frame as indicated by a straight double arrow. The slide is only partly seen, and it will be appreciated that it may be equipped to carry a cutting tool or a workpiece as is conventional in this art. Reciprocating movement of the slide 10 is actuated by a multi-armed bell crank lever 16 which is mounted on a stationary bearing 14. The first arm 18 of the lever 16 is hingedly connected to the slide 10 by a link 20.

Another arm 22 of the lever 16 carries a cam follower arrangement 24 which will be described in more detail hereinafter. The cam follower travels on the face of a radial cam 26 of a type commonly employed in machine tools. The cam 26 is driven by a shaft 27 which is journaled in a fixed bearing 28 on the machine frame and is connected to the main drive of the machine in a conventional manner not relevant to this invention. The shaft 27 normally rotates at a constant speed.

The third arm 30 of the lever 16 has a terminal cam face or abutment face 32 of arcuate shape about the axis of the bearing 14. A first portion 36 of the face 32 is circular about that axis, and a second contiguously consecutive face portion 34 spirals from the juncture with the portion 36 in a circumferential and radially inward direction. When the cam follower 24 moves along the cam face of the cam 26 during rotation of the latter, the arm 30 pivots back and forth as indicated by a curved double arrow.

An aligned portion of the abutment face 32 cooperates with a roller 38 which abuts against the cam face portion 36 in a radial direction, and against the abutment face portion 34 in an approximately radial direction toward the axis of the bearing 14 when in respective alignment with these abutment face portions. The roller 38 is mounted on the free end of a rocker arm 40 whose other end is mounted on a fixed pivot 42.

The roller 38 is urged into engagement with the abutment face 32 by a helical compression spring 46 mounted outside the space between the slide 10 and the supporting frame portion 12 in a cage consisting of two axial end plates 44, 48 and of two telescopically engaged tubular guides 54, 56 which are respectively fastened to the plates 44, 48. Respective approximately spherical recesses in the plates 44, 48 are movably engaged by conforming heads of a stud 43 fixed on the free end of the rocker arm 40 and of a longitudinally adjustable pin 50 which is mounted on a portion 52 of the stationary machine frame.

When the roller 38 is engaged with the abutment face portion 34, a circumferential component of the force of spring 46 tends to move the lever arm 30 clockwise, as viewed in FIG. 1, and thereby to press the cam follower 24 into firm engagement with the face of the cam 26. Counterclockwise movement of the cam follower is actuated by the pressure of the cam 26 against the force of the spring 46 as the cam rotates on the shaft 27. The slide 10 is connected to the cam follower for joint movement by the linkage constituted by the lever 16 and the links 20.

The dimensions of the several portions of the lever 16 are selected in such a manner that the roller 38 travels back and forth only on the abutment face portion 34 during the rotation of the cam 26, but closely approaches or actually reaches the juncture between the two face portions. A long fourth arm 58 of the lever 16 carries a handle 59. When the roller 38 travels on the abutment face portion 36, the force of the spring 46 transmitted to the arm 30 lacks a circumferential component, and the lever 16 can be freely moved by the handle 59.

If it is desired to move the slide 10 beyond its normal operating range, the rotation of the shaft 27 is stopped when the roller is at or closely adjacent the juncture of the abutment face portions 34, 36, as illustrated in FIG. 1, and the slide 10 may then readily be moved further toward the right by raising the handle 59.

It will be appreciated that a movement of the slide 10 beyond its normal operating range toward the left, as viewed in FIG. 1, may be readily actuated by the handle 59 if the abutment face 32 is modified to include another circular portion. Such an obvious modification of the illustrated apparatus will not usually be required.

In the illustrated position of the apparatus, the roller 38 engages a portion of the abutment face 32 adjacent the face portion 36 which is farthest removed from the axis of the shaft 14. The spring 46 simultaneously is expanded to the maximum extent reached during operation of the device. Conversely, when the roller engages the end of the abutment face portion 34 farthest removed from the circular face portion 36 and closest to the axis of the bearing 14, the spring 46 is most strongly compressed. Because of the oblique angle between the direction of spring force and the direction in which the force is transmitted to the face 32, the weakest spring force acts on the longest effective lever arm, and the strongest spring force acts on the shortest effective lever arm. The torque produced for urging the cam follower 24 against the face of the cam 26 does not vary much during rotation of the cam, and can be held virtually constant by suitably dimensioning the elements of the apparatus.

If it is intended to use the apparatus with different cams 26, the several arms of the lever 16 are preferably releasably secured to each other. Variations in the angular relationship of the several arms may be used to adjust the apparatus to the characteristics of the several cams. A common shaft and set screws on the several arms or similar common expedients will readily suggest themselves for providing the desired adjustability.

Figure 2:
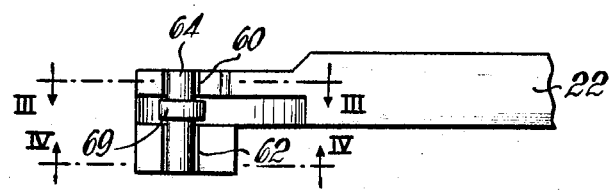
FIG. 2 illustrates a detail of the apparatus of FIG. 1 in front elevation, the location of the detail being indicated in FIG. 1 by the letter A and a chain-dotted line.
Figure 3:
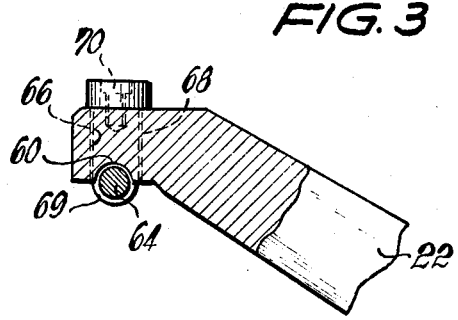
FIGS. 3 and 4 are respective partly sectional views of the device of FIG. 2 taken on the lines III—III and IV—IV respectively.
Figure 4:
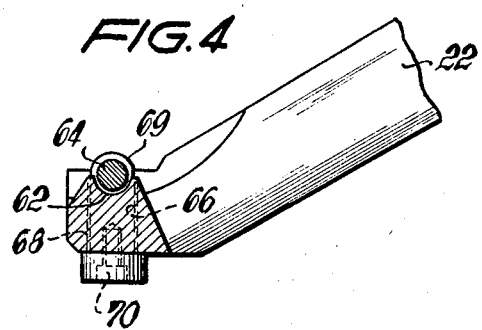

Details of the cam follower arrangement 24 are shown in FIGS. 2 to 4 on a somewhat enlarged scale. The free end of the arm 22 has a transverse semi-cylindrical groove whose two axial portions 60, 62 are separated by a perpendicular bore 68. A pin 66 having an eyelet 69 thereon is longitudinally slidable in the bore 68. A cylindrical bar 64 is received in the groove 60, 62 and passes through the eyelet 69. A nut 70 on the end of the pin 66 opposite from the eyelet may be tightened to pull the bar 64 inward of the bore 68 into firm abutting engagement with the bottom of the groove 60, 62.

When the cam 26 rotates in contact with the cam follower 24, a surface portion of the bar 64 on one side of the eyelet 69 slides along the cam face. When the contact portion of the bar 64 wears down to an extent that may affect the precision of the machine, the nut 70 is loosened and the bar 64 is turned to present a new contact face to the cam 26. Eventually, the bar is turned end-over-end to utilize the portion thereof which originally was on the other side of the eyelet 69.

It should be understood, of course, that the foregoing disclosure relates to only a preferred embodiment of the invention, and that numerous modifications or alterations may be made therein without departing from the spirit and the scope of the invention as set forth on the appended claims.

What is claimed is:
1. In a cutting tool arrangement, in combination:
 (a) a support;
 (b) a cam member mounted on said support and having a cam face;
 (c) means for actuating movement of said cam member on said support;
 (d) a cam follower engageable with said cam face for movement thereby when said cam member moves;
 (e) a slide member movably mounted on said support;
 (f) linkage means connecting said cam follower to said slide member for joint movement;
 (g) a first abutment member connected to said cam follower for joint movement, said abutment member moving in a predetermined direction when said cam follower is moved by said cam member, said abutment member having an abutment face;
 (h) a second abutment member movable on said support toward and away from abutting engagement with an aligned portion of said abutment face in a direction substantially transverse of said predetermined direction; and
 (i) yieldably resilient means permanently urging said second abutment member toward said engagement,
  (1) said abutment face having two portions consecutive in said predetermined direction and alignable with said second abutment member,
  (2) one abutment face portion being substantially perpendicular to said transverse direction when aligned with said second abutment member, and
  (3) the other abutment face portion being obliquely inclined relative to said directions in such a manner that said cam follower is urged by said resilient means toward said cam member when said second abutment member engages said second abutment face portion.

2. In an arrangement as set forth in claim 1, said first abutment member being mounted on said support for rotation about an axis, said one abutment face portion being substantially circular about said axis.

3. In an arrangement as set forth in claim 1, said yieldably resilient means including a spring member.

4. In an arrangement as set forth in claim 1, a rocker member pivotally fastened on said support, said second abutment member being mounted on said rocker member for engaging said abutment face in said transverse direction.

5. In an arrangement as set forth in claim 4, said resilient means being mounted on said support in engagement with said rocker member for exerting pressure on said rocker member in a direction oblique with respect to said transverse direction.

6. In an arrangement as set forth in claim 1, said first abutment member constituting one arm of a lever pivotally mounted on said support and having a plurality of arms, said cam follower being mounted on another arm of said lever, and said linkage means connecting one of said arms to said slide member.

7. In an arrangement as set forth in claim 6, handle means on one of said arms for manually pivoting said first abutment member when said one abutment face portion engages said second abutment member.

8. In an arrangement as set forth in claim 1, said actuating means constituting means for rotating said cam member about an axis.

9. In an arrangement as set forth in claim 1, said first abutment member being mounted on said support for rotation about an axis, said one abutment face portion being substantially circular about said axis, and said other abutment face portion spiralling away from said one portion in a circumferential and radially inward direction.

10. In an arrangement as set forth in claim 1, said cam follower including a supporting arm, a terminal portion of said arm being formed with a groove of substantially cylindrical contour and with a bore transverse of said groove; an eyelet member movable in said bore and formed with a passage therethrough axially alignable with said groove; a cam follower pin normally engaging said cam face, said pin being partly received in said groove and in said passage; and tensioning means for urging said eyelet member inward of said bore in such a manner as to press said pin against said arm in said groove.

11. In an arrangement as set forth in claim 1, said first abutment member being mounted on said support for rotation about an axis, and said cam follower being secured on said first abutment member.

12. In an arrangement as set forth in claim 1, said yieldably resilient means being arranged outside the space between said slide member and said support.

References Cited by the Examiner

UNITED STATES PATENTS

| | | | |
|---|---|---|---|
| 1,784,902 | 12/1930 | Maurais | 74—55 |
| 2,112,607 | 3/1938 | Pooley | 74—516 |
| 2,429,659 | 10/1947 | Zellweger et al. | 74—55 X |
| 2,672,058 | 3/1954 | Lee | 74—54 X |
| 2,741,896 | 4/1956 | Geiger | 74—518 |
| 2,883,865 | 4/1959 | Lyman | 74—55 X |

MILTON KAUFMAN, Primary Examiner.

BROUGHTON G. DURHAM, Examiner

F. E. BAKER, Assistant Examiner.